United States Patent
Cotton et al.

(10) Patent No.: US 7,941,257 B2
(45) Date of Patent: May 10, 2011

(54) METHOD AND SYSTEM FOR DETECTING INSTALLATION OF AN UNMONITORED TIRE ON A VEHICLE

(75) Inventors: Kevin Cotton, Fenton, MI (US); Keith E. Mattson, Livonia, MI (US); John S. Nantz, Brighton, MI (US)

(73) Assignee: Lear Corporation, Southfield, MI (US)

( * ) Notice: Subject to any disclaimer, the term of this patent is extended or adjusted under 35 U.S.C. 154(b) by 831 days.

(21) Appl. No.: 11/928,341

(22) Filed: Oct. 30, 2007

(65) Prior Publication Data

US 2009/0112390 A1 Apr. 30, 2009

(51) Int. Cl.
*B60C 23/00* (2006.01)
*G01M 17/02* (2006.01)
*G06F 17/00* (2006.01)

(52) U.S. Cl. ............... 701/29; 701/2; 701/33; 340/442; 340/447

(58) Field of Classification Search ............... 701/29, 701/2, 33, 32; 340/447, 445, 442, 438
See application file for complete search history.

(56) References Cited

U.S. PATENT DOCUMENTS

| | | | |
|---|---|---|---|
| 5,838,229 A * | 11/1998 | Robinson, III ............... 340/442 |
| 6,304,802 B1 * | 10/2001 | Stuible et al. ............... 701/29 |
| 6,441,728 B1 | 8/2002 | Dixit et al. |
| 6,448,891 B2 | 9/2002 | Barnett |
| 6,900,725 B1 | 5/2005 | Berry et al. |
| 6,954,687 B2 | 10/2005 | Taguchi et al. |
| 6,960,994 B2 | 11/2005 | Tabata et al. |
| 6,985,076 B1 | 1/2006 | Bennie et al. |
| 7,030,745 B2 * | 4/2006 | Utter et al. ............... 340/447 |
| 7,131,323 B2 | 11/2006 | Hirota |
| 7,224,269 B2 | 5/2007 | Miller et al. |
| 7,528,707 B1 * | 5/2009 | Wallace ............... 340/442 |
| 2005/0200464 A1 | 9/2005 | Bennie et al. |
| 2006/0001533 A1 | 1/2006 | Bessho et al. |
| 2006/0132296 A1 | 6/2006 | Robson et al. |

\* cited by examiner

*Primary Examiner* — Tan Q Nguyen
(74) *Attorney, Agent, or Firm* — Brooks Kushman P.C.

(57) ABSTRACT

A tire pressure monitoring system includes sensors respectively associated with tires normally installed on a vehicle. Each sensor transmits a sensor signal indicative of a parameter of the associated tire to a controller. The signal strength of each sensor signal as received by the controller varies over time when the tire is rolling and remains constant over time when the tire is stationary. The controller generates a received signal strength indicator (RSSI) signal indicative of the signal strength of each sensor signal as received by the controller. The controller processes the RSSI signals along with a speed signal indicative of whether the vehicle is moving or is stationary to determine if any tire is stationary while the vehicle is moving, and generates a warning indicative of an unmonitored tire installed on the vehicle in place of a tire upon determining that the tire is stationary while the vehicle is moving.

20 Claims, 2 Drawing Sheets

METHOD AND SYSTEM FOR DETECTING INSTALLATION OF AN UNMONITORED TIRE ON A VEHICLE

BACKGROUND OF THE INVENTION

1. Field of the Invention

The present invention relates to a tire pressure monitoring system operable for detecting the installation of an unmonitored tire on a vehicle.

2. Background Art

A typical tire pressure monitoring system (TPMS) for a vehicle includes wheel units and a controller. Each wheel unit includes a transmitter, a pressure sensor, and a motion sensor such as an accelerometer. The wheel units are respectively installed to the tires of the vehicle and the controller is installed in the vehicle. Each wheel unit has a unique identifier to identify the tire to which the wheel unit is installed. The pressure sensors generate pressure signals indicative of the air (i.e., pneumatic) pressure of their associated tires and the motion sensors generate motion signals (e.g., bit-type information) indicative of whether their associated tires are moving or are stationary. A tire is rolling when the tire is installed on the vehicle and the vehicle is moving. A tire is stationary when the tire is installed on the vehicle and the vehicle is not moving or when the tire is stored in a vehicle compartment irrespective of vehicle movement. The transmitters transmit wheel unit signals containing the pressure and motion signals and the identifiers to the controller. The controller uses the identifiers to discern the pressure and motion signals for each tire. The controller determines the pressure of the tires based on the pressure signals and generates a warning for any tire having abnormal pressure.

The controller uses the motion signals indicative of whether the tires are rolling or are stationary in order to determine whether the tires are installed on the vehicle. For instance, if a tire is rolling, then the controller determines that the tire is installed on the vehicle. However, if a tire is stationary, then the controller uses knowledge of vehicle movement to determine if the tire is installed on the vehicle. To this end, the controller receives from the vehicle a speed signal indicative of vehicle speed (i.e., indicative of whether the vehicle is moving or is stationary). As such, if a tire is stationary and the vehicle is moving, then the controller determines that the tire is not installed on the vehicle. In this event, as the controller receives the motion signal for the tire indicating that the tire is stationary and as the controller is aware of the vehicle moving, the controller determines that the tire is stored in a vehicle compartment and another tire (such as a spare tire) is installed on the vehicle in place of the tire.

A vehicle having a TPMS typically includes four tires which are normally installed on the vehicle and a spare tire which is stored in a vehicle compartment for emergency use. The spare tire may be installed on the vehicle in place of a normally installed tire in the event that the normally installed tire is not functioning properly (e.g., when the normally installed tire is punctured and is flat). Each normally installed tire includes a wheel unit. The spare tire lacks a wheel unit.

The wheel units of the normally installed tires are registered with the controller such that the controller processes their wheel unit signals while ignoring other wheel unit signals (such as those transmitted by wheel units of nearby vehicles). That is, the wheel unit signals of the registered wheel units are valid wheel unit signals which are recognized and processed by the controller. These wheel units are considered "learned" wheel units by the controller by being registered with the controller. A normally installed tire is considered to be a "monitored" tire as a result of the controller being able to communicate with the wheel unit for the tire (e.g., being able to receive a valid wheel unit signal for the tire) when the wheel unit is functioning properly.

The controller does not receive a wheel unit signal for the spare tire as the spare tire lacks a wheel unit. As such, the spare tire is considered to be an "unmonitored" tire as a result of the controller not being able to communicate with the tire (e.g., not being able to receive a valid wheel unit signal for the spare tire). As a result, the spare tire is "incompatible" with the TPMS. Likewise, a normally installed tire is considered to be an unmonitored tire when its wheel unit is not capable of communicating with the controller. This may occur when the wheel unit is damaged or when the wheel unit is not registered with the controller (e.g., an "unlearned" wheel unit). That is, if the wheel unit of a tire is not able to communicate with the controller for any reason, then the tire is an unmonitored tire and is incompatible with the TPMS.

The TPMS is required to detect the installation of an unmonitored tire on the vehicle as certain regulations require that a warning be turned on to indicate the presence of an unmonitored tire on a vehicle. The TPMS can detect the installation of an unmonitored tire when the normally installed tires include motion sensors. For instance, if the vehicle is moving and a motion signal of a tire indicates that the tire is stationary, then the controller determines that the tire is not installed on the vehicle and that an unmonitored tire is installed on the vehicle in its place. Similarly, in the case of the vehicle moving and the controller receiving only three wheel unit signals (instead of four wheel unit signals during proper operation of the wheel units of the four normally installed tires), the controller determines that one of the tires installed on the vehicle is an unmonitored tire. The unmonitored tire may be a normally installed tire having a defective wheel unit, the spare tire, or a foreign tire having an unlearned wheel unit (i.e., another normally installed tire having an unlearned wheel unit).

Without the use of motion sensors, the requirement of detecting the installation of an unmonitored tire on a vehicle is a problem. For instance, in the event of a normally installed tire being stored in the vehicle compartment and the spare tire being installed on the vehicle in its place, the wheel unit of the normally installed tire continues to periodically transmit its wheel unit signal containing its pressure signal. (The transmitter of a wheel unit having a motion sensor typically transmits less often when the associated tire is stationary.) The normally installed tire is likely flat as a result of being replaced by the spare tire and its pressure signal indicates same. As a result, the controller is led to believe that the flat normally installed tire is on the vehicle and has an abnormal pressure. More importantly, the controller is not aware of the presence of the spare tire (i.e., an unmonitored tire) on the vehicle as the controller still receives four wheel unit signals (one wheel unit signal from the flat normally installed tire and three wheel unit signals from the remaining normally installed tires). As a result, the TPMS does not meet the requirement of detecting the installation of an unmonitored spare tire (i.e., a tire lacking a wheel unit) on a vehicle when a normally installed tire is stored in the vehicle compartment, the wheel units of the normally installed tires lack motion sensors, and the wheel units of the normally installed tires periodically transmit wheel unit signals.

Likewise, in the event of a normally installed tire being stored in the vehicle compartment and a foreign tire having an unlearned wheel unit being installed on the vehicle in its place, the controller is not aware of the presence of the foreign tire (i.e., an unmonitored tire) on the vehicle as the controller still receives the four wheel unit signals from the four normally installed tires which the controller considers valid along with a fifth wheel unit signal from the foreign tire which the controller considers non-valid and ignores. As a result, the TPMS does not meet the requirement of detecting the installation of an unmonitored foreign tire (i.e, a tire having an unlearned wheel unit) on a vehicle when a normally installed tire is stored in the vehicle compartment, the wheel units of the normally installed tires lack motion sensors, and the wheel units of the normally installed tires periodically transmit wheel unit signals.

It is desired to reduce the cost of the TPMS by eliminating motion sensors from the wheel units while meeting the requirement of the TPMS being able to detect the installation of an unmonitored tire on a vehicle.

SUMMARY OF THE INVENTION

An object of the present invention includes a tire pressure monitoring system (TPMS) operable for detecting the installation of an unmonitored tire on a vehicle without the use of motion sensors.

Another object of the present invention includes detecting whether an unmonitored tire is installed on a vehicle without the use of motion sensors associated with the tires of the vehicle.

A further object of the present invention includes detecting whether a normally installed tire is rolling or is stationary without the use of a motion sensor associated with the tire in order to enable a TPMS to determine whether the normally installed tire is installed on the vehicle.

Another object of the present invention includes a TPMS having a controller in a vehicle and wheel units respectively in the tires normally installed on the vehicle in which the wheel units lack motion sensors with the controller detecting whether the tires are in motion from signals transmitted from the wheel units in order to determine whether an unmonitored tire (such as a spare tire lacking a wheel unit or a normally installed tire having a defective or unlearned wheel unit) is installed on the vehicle.

A further object of the present invention includes a TPMS having a controller in a vehicle and wheel units respectively in the tires normally installed on the vehicle in which the wheel units lack motion sensors and periodically transmit signals regardless of whether the tires are in motion with the controller detecting whether the tires are in motion from the signals in order to determine whether an unmonitored tire (such as a spare tire lacking a wheel unit or a normally installed tire having a defective or unlearned wheel unit) is installed on the vehicle.

Another object of the present invention includes a TPMS having a controller in a vehicle and wheel units respectively in the tires normally installed on the vehicle in which the wheel units include pressure sensors for transmitting pressure signals indicative of the pressure of the associated tires with the controller using the pressure signals to detect whether the tires are in motion based on the pressure of the tires in order to determine whether an unmonitored tire (such as a spare tire lacking a wheel unit or a normally installed tire having a defective or unlearned wheel unit) is installed on the vehicle.

A further object of the present invention includes a TPMS having a controller in a vehicle and wheel units respectively in the tires normally installed on the vehicle in which the wheel units include temperature sensors for transmitting temperature signals indicative of the temperature of the associated tires with the controller using the temperature signals to detect whether the tires are in motion based on the temperature of the tires in order to determine whether an unmonitored tire (such as a spare tire lacking a wheel unit or a normally installed tire having a defective or unlearned wheel unit) is installed on the vehicle.

Another object of the present invention includes a TPMS having a controller in a vehicle and wheel units respectively in the tires normally installed on the vehicle in which the wheel units transmit signals to the controller which are received by the controller as a function of rotation of the tires such that the controller is able to detect whether the tires are in motion from the signals in order to determine whether an unmonitored tire (such as a spare tire lacking a wheel unit or a normally installed tire having a defective or unlearned wheel unit) is installed on the vehicle.

A further object of the present invention includes a TPMS having a controller in a vehicle and wheel units respectively in the tires normally installed on the vehicle in which the wheel units transmit signals to the controller and for each signal the controller generates a received signal strength indicator (RSSI) signal which varies as a function of rotation of the tires such that the controller is able to detect whether the tires are in motion from the RSSI signals in order to determine whether an unmonitored tire (such as a spare tire lacking a wheel unit or a normally installed tire having a defective or unlearned wheel unit) is installed on the vehicle.

In carrying out the above objects and other objects, the present invention provides a tire pressure monitoring system (TPMS). The system includes wheel units respectively associated with tires normally installed on a vehicle. Each wheel unit includes a sensor for generating a sensor signal indicative of a parameter of the associated tire which varies compared to a threshold when the tire is installed on the vehicle and is rolling while the vehicle is moving and which remains constant compared to the threshold when the tire is stationary irrespective of whether the vehicle is moving, a processor for processing the sensor signal to determine whether the tire is rolling or is stationary, and a transmitter for transmitting a tire signal including an indication of whether the tire is rolling or is stationary. The system further includes a controller to be installed in the vehicle. The controller includes a receiver for receiving the tire signals from the wheel units. The controller further receives a speed signal indicative of whether the vehicle is moving or is stationary. The controller processes the tire signals and the speed signal to determine if any of the tires is stationary while the vehicle is moving. The controller generates a warning signal indicative of an unmonitored tire installed on the vehicle in place of one of the tires upon determining that the one of the tires is stationary while the vehicle is moving.

In an embodiment, the sensor includes a pressure sensor for generating a pressure sensor signal indicative of the pressure of the tire. The pressure of the tire varies compared to a threshold when the tire is installed on the vehicle and is rolling while the vehicle is moving and remains constant compared to the threshold when the tire is stationary irrespective of whether the vehicle is moving. The tire signal transmitted by the transmitter includes the pressure sensor signal. The controller processes the pressure sensor signal to determine the pressure of the tire, and generates a warning signal if the pressure of the tire is abnormal.

In an embodiment, the sensor includes a temperature sensor for generating a temperature sensor signal indicative of the temperature of the tire. The temperature of the tire varies compared to a threshold when the tire is installed on the vehicle and is rolling while the vehicle is moving and remains constant compared to the threshold when the tire is stationary irrespective of whether the vehicle is moving. The tire signal transmitted by the transmitter includes the temperature sensor signal. The controller processes the temperature sensor signal to determine the temperature of the tire, and generates a warning signal if the temperature of the tire is abnormal.

In an embodiment, the sensor includes a pressure sensor for generating a pressure sensor signal indicative of the pressure of the tire and a temperature sensor for generating a temperature sensor signal indicative of the temperature of the tire. Both the pressure and the temperature of the tire vary compared to respective thresholds when the tire is installed on the vehicle and is rolling while the vehicle is moving and remain constant compared to respective thresholds when the tire is stationary irrespective of whether the vehicle is moving.

In an embodiment, the signal strength of each tire signal as received by the receiver varies over a period of time when the associated tire is rolling and remains constant over the period of time when the associated tire is stationary. For each tire signal the receiver generates a received signal strength indicator (RSSI) signal indicative of the signal strength of the tire signal as received by the receiver and provides the RSSI signals to the controller. The controller processes the RSSI signals along with the tire signals and the speed signal to determine if any of the tires is stationary while the vehicle is moving.

Further, in carrying out the above objects and other objects, the present invention provides another TPMS. This system includes wheel units respectively associated with tires normally installed on a vehicle. Each wheel unit includes a sensor for generating a sensor signal indicative of a parameter of the associated tire and a transmitter for transmitting the sensor signal. This system further includes a controller to be installed in the vehicle. The controller includes a receiver for receiving the sensor signals from the wheel units. The signal strength of each sensor signal as received by the receiver varies over a period of time when the associated tire is rolling and remains constant over the period of time when the associated tire is stationary. For each sensor signal the receiver generates a received signal strength indicator (RSSI) signal indicative of the signal strength of the sensor signal as received by the receiver and provides the RSSI signals to the controller. The controller further receives a speed signal indicative of whether the vehicle is moving or is stationary. The controller processes the RSSI signals and the speed signal to determine if any of the tires is stationary while the vehicle is moving. The controller generates a warning signal indicative of an unmonitored tire installed on the vehicle in place of a tire upon determining that the tire is stationary while the vehicle is moving.

While processing each RSSI signal and the speed signal to determine if a tire is stationary while the vehicle is moving, the controller determines that the tire is stationary if the RSSI signal remains constant over a period of time. Likewise, while processing each RSSI signal and the speed signal to determine if a tire is stationary while the vehicle is moving, the controller determines that the tire is rolling if the RSSI signal varies over a period of time.

In an embodiment, the sensor is a pressure sensor and the sensor signal is indicative of the pressure of the tire. The controller processes the pressure signal to determine the pressure of the tire. The controller generates a warning signal if the pressure of the tire is abnormal.

In an embodiment, the sensor is a temperature sensor and the sensor signal is indicative of the temperature of the tire. The controller processes the sensor signal to determine the temperature of the tire. The controller generates a warning signal if the temperature of the tire is abnormal.

Also, in carrying out the above objects and other objects, the present invention provides a tire pressure monitoring method. The method includes monitoring a parameter of a tire normally installed on a vehicle. A sensor signal indicative of the parameter of the tire is generated and transmitted from the tire to a controller installed on the vehicle. The signal strength of the sensor signal as received by the controller varies over a period of time when the tire is rolling and remains constant over the period of time when the tire is stationary. A received signal strength indicator (RSSI) signal indicative of the signal strength of the sensor signal as received by the controller is generated at the controller. A speed signal indicative of whether the vehicle is moving or is stationary is provided to the controller. The RSSI signal and the speed signal is processed at the controller to determine if the tire is stationary while the vehicle is moving. A warning signal indicative of an unmonitored tire installed on the vehicle in place of the tire is generated at the controller upon determining that the tire is stationary while the vehicle is moving.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
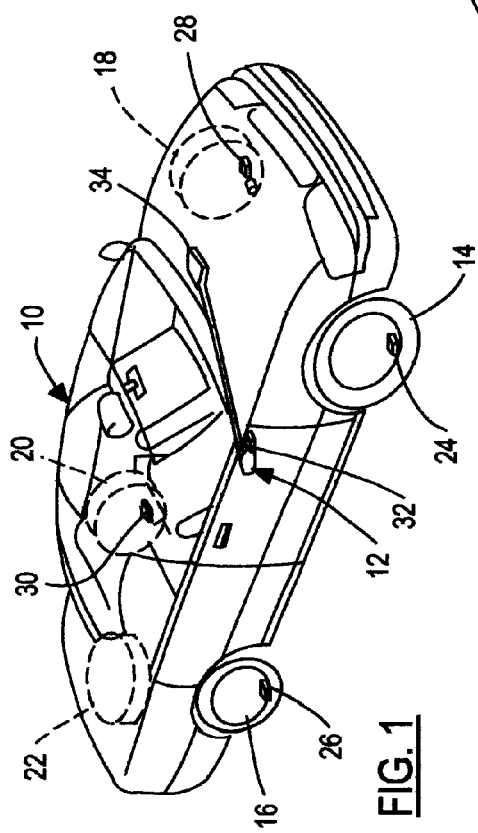
FIG. 1 illustrates a vehicle having a tire pressure monitoring system (TPMS) in accordance with an embodiment of the present invention.

Referring now to FIG. 1, a vehicle 10 having a tire pressure monitoring system (TPMS) 12 in accordance with an embodiment of the present invention is shown. Vehicle 10 includes four tires 14, 16, 18, and 20 which are normally installed on the respective four wheels of the vehicle. The normally installed tires include front-right tire 14, rear-right tire 16, front-left tire 18, and rear-left tire 20. Vehicle 10 further includes a spare tire 22 which is normally not installed on a wheel but is stored in a vehicle compartment for emergency use.

TPMS 12 includes wheel electronics units 24, 26, 28, and 30 for tires 14, 16, 18, and 20. Wheel units 24, 26, 28, and 30 are respectively installed to tires 14, 16, 18, and 20. Spare tire 22 lacks a wheel unit. TPMS 12 further includes a controller 32 installed in vehicle 10. In general, wheel units 24, 26, 28, and 30 wirelessly transmit wheel unit signals containing pressure signals indicative of the air (i.e., pneumatic) pressure of the associated tires 14, 16, 18, and 20 to controller 32. Controller 32 processes the pressure signals to determine whether any of tires 14, 16, 18, and 20 have proper or improper pressure. In the case of any of these tires having an improper pressure, controller 32 causes a display 34 to generate a warning indicative of same for an operator of the vehicle while the tire(s) is installed on vehicle 10 (as described below).

Figure 2:
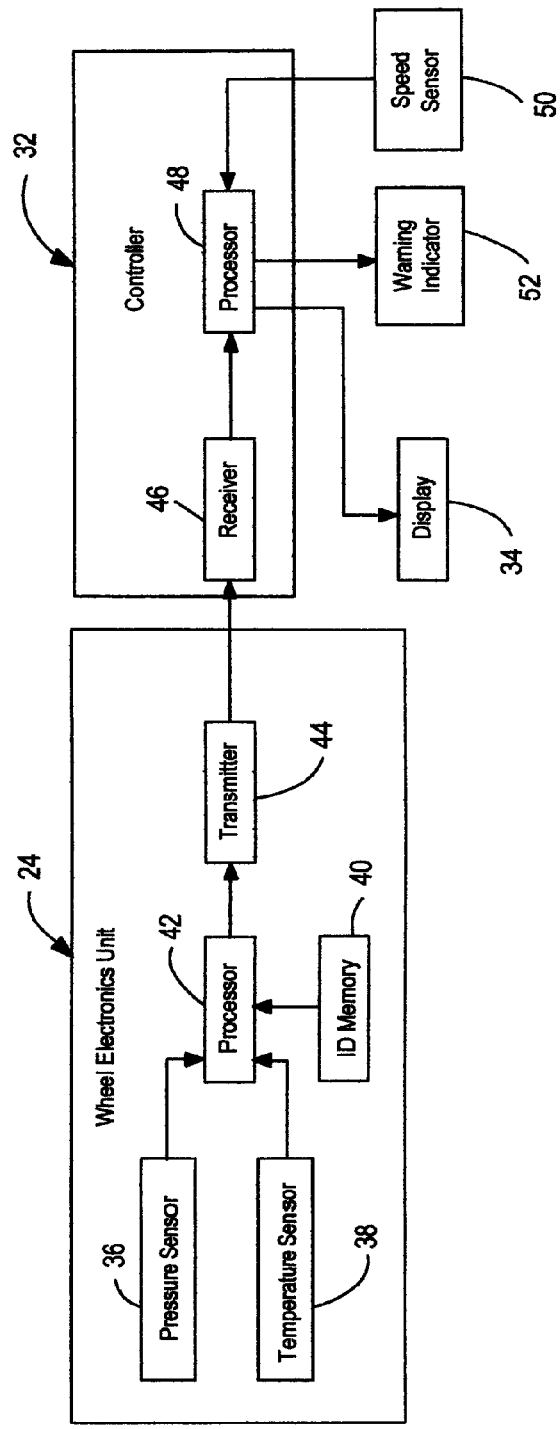
FIG. 2 illustrates a block diagram of the TPMS.

Referring now to FIG. 2, with continual reference to FIG. 1, a block diagram of TPMS 12 is shown. As noted, TPMS 12 includes wheel units 24, 26, 28, and 30 respectively installed to tires 14, 16, 18, and 20. Wheel units 24, 26, 28, and 30 are structurally similar to one another. As such, only wheel unit 24 installed to tire 14 is shown in FIG. 2 and will be described.

Wheel unit 24 includes a pressure sensor 36, a temperature sensor 38, an identification (ID) memory 40, a processor 42, and a transmitter 44. Pressure sensor 36 monitors the air (i.e., pneumatic) pressure of tire 14 and generates a pressure signal indicative of the pressure of tire 14. Likewise, temperature sensor 38 monitors the temperature of tire 14 and generates a temperature signal indicative of the temperature of tire 14. ID memory 40 generates an identifier signal uniquely assigned to wheel unit 24. The identifier signal is indicative of the identity of tire 14 to which wheel unit 24 is installed. In operation, processor 42 receives the pressure signal from pressure sensor 36, the temperature signal from temperature sensor 38, and the identifier signal from ID memory 40. In turn, processor 42 generates a wheel unit signal containing the pressure, temperature, and identifier signals and provides the wheel unit signal to transmitter 44. Transmitter 44 wirelessly transmits the wheel unit signal for receipt by controller 32. This operation of wheel unit 24 occurs periodically while wheel unit 24 is functioning properly regardless of whether tire 14 is installed on vehicle 10 or is stored in the vehicle compartment. As such, transmitter 44 periodically transmits wheel unit signals indicative of tire 14 for receipt by controller 32.

Controller 32, which is installed in vehicle 10, includes a receiver 46 and a processor 48. Receiver 46 wirelessly receives the wheel unit signal from transmitter 44 of wheel unit 24 and provides the wheel unit signal to processor 48. Processor 48 processes the wheel unit signal to determine whether the pressure of tire 14 is normal or abnormal. In the event that the pressure of tire 14 is abnormal, processor 48 actuates display 34 to generate a warning indicating same. Processor 48 is able to determine the identity of tire 14 from the identifier signal contained in the wheel unit signal.

In general, wheel units 24, 26, 28, and 30 of normally installed tires 14, 16, 18, and 20 register with controller 32 such that the controller processes their wheel unit signals while ignoring any other received wheel unit signal (such as those transmitted by wheel units of nearby vehicles). That is, the wheel unit signals of the wheel units 24, 26, 28, and 30 are valid wheel unit signals which are recognized and processed by controller 32. Wheel units 24, 26, 28, and 30 are considered "learned" wheel units by controller 32 by being registered with the controller. Each normally installed tire 14, 16, 18, and 20 is considered to be a "monitored" tire as a result of controller 32 being able to communicate with the associated wheel units 24, 26, 28, and 30 (e.g., being able to receive valid wheel unit signals for the tires) when the wheel units are functioning properly.

Controller 32 does not receive a wheel unit signal for spare tire 22 as the spare tire lacks a wheel unit. As such, spare tire 22 is considered to be an "unmonitored" tire as a result of controller 32 not being able to communicate with the spare tire (e.g., not being able to receive a valid wheel unit signal for the spare tire). Likewise, any one of normally installed tires 14, 16, 18, and 20 is considered to be an unmonitored tire when its associated wheel unit 24, 26, 28, and 30 is not capable of communicating with controller 32. This may occur when the associated wheel unit is not functioning properly or is not registered with controller 32 (e.g., an "unlearned" wheel unit). That is, if the wheel unit of a tire such as a normally installed tire 14, 16, 18, and 20 is not able to communicate with controller 32 for any reason, then the tire is an unmonitored tire. Further, any other tire which can be normally installed on vehicle 10 and which has a wheel unit is considered to be an unmonitored (foreign) tire if the wheel unit is unlearned. As such, an unmonitored tire may be a normally installed tire 14, 16, 18, and 20 having a defective wheel unit, spare tire 22 which lacks a wheel unit, or a foreign tire which can be a normally installed tire but has an unlearned wheel unit.

In accordance with embodiments of the present invention, wheel units 24, 26, 28, and 30 each lack a motion sensor such as an accelerometer. Such a motion sensor is able to directly monitor the associated tire to which it is installed to determine whether the tire is rolling or is stationary.

In general, controller 32 (i.e., processor 48) is operable for determining whether an unmonitored tire is installed on vehicle 10 even though wheel units 24, 26, 28, and 30 lack motion sensors. In particular, controller 32 is operable for detecting the installation of spare tire 22 (i.e., an unmonitored tire which lacks a wheel unit) on vehicle 10 in place of one of normally installed tires 14, 16, 18, and 20 when the normally installed tire is stored in the vehicle compartment, wheel units 24, 26, 28, and 30 lack motion sensors, and the wheel units continue to periodically transmit wheel unit signals. Likewise, controller 32 is operable for detecting the installation of a foreign tire (i.e., an unmonitored tire having an unlearned wheel unit) on vehicle 10 in place of one of normally installed vehicles 14, 16, 18, and 20 when the normally installed tire is stored in the vehicle compartment, wheel units 24, 26, 28, and 30 lack motion sensors, and the wheel units continue to periodically transmit wheel unit signals.

Controller 32 is able to determine the installation of an unmonitored tire on vehicle 10 by analyzing information contained in the four wheel unit signals for tires 14, 16, 18, and 20 such as the pressure and/or temperature information and/or by analyzing the received strength of each of the wheel unit signals over a period of time. Controller 32 employs a speed signal indicative of the vehicle speed in making this determination. To this end, as shown in FIG. 2, a speed sensor 50 in vehicle 10 provides the speed signal to processor 48. Controller 32 determines whether vehicle 10 is moving or is stationary based on the speed signal. From the knowledge of whether vehicle 10 is moving or is stationary in conjunction with analysis of the wheel unit signals, controller 32 is able to determine whether an unmonitored tire is installed on vehicle 10 as explained in further detail below. Upon controller 32 determining the installation of an unmonitored tire on vehicle 10, the controller actuates a warning indicator 52.

It is noted that when a normally installed tire such as tire 14 is installed on vehicle 10 and has a non-functioning wheel unit which cannot transmit a wheel unit signal (i.e., an unmonitored tire), controller 32 is able to detect the installation of the unmonitored tire 14 on the vehicle as a result of receiving only three wheel unit signals (from the remaining tires 16, 18, and 20) instead of four wheel unit signals.

Figures 3, 4:
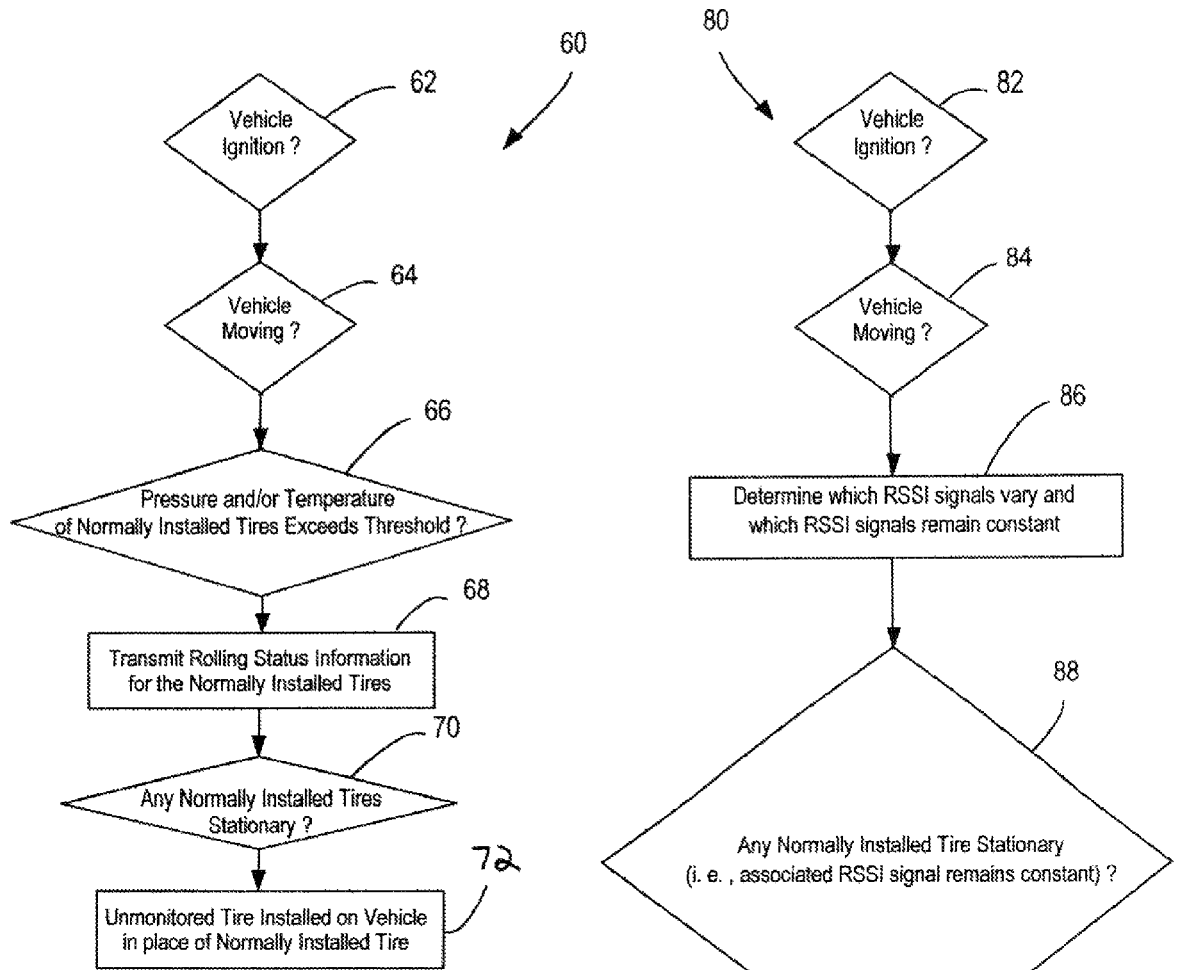
FIG. 3 illustrates a flowchart describing operation of the TPMS in accordance with a first operation for detecting the installation of an unmonitored tire on the vehicle.
FIG. 4 illustrates a flowchart describing operation of the TPMS in accordance with a second operation for detecting the installation of an unmonitored tire on the vehicle.

Referring now to FIG. 3, with continual reference to FIGS. 1 and 2, a flowchart 60 describing operation of TPMS 12 in accordance with a first operation for detecting the installation of an unmonitored tire on vehicle 10 is shown. In general, the first operation represents an inferred tire rolling technique using pressure and/or temperature information. In this technique, each wheel unit 24, 26, 28, and 30 makes its own determination of whether its associated tire is rolling or is stationary based on the pressure and/or temperature information for the tire. In turn, wheel units 24, 26, 28, and 30 provide an indication of whether its associated tire is rolling or is stationary to controller 32. The indications are included with the wheel unit signals transmitted by wheel units 24, 26, 28, and 30 to controller 32. Controller 32 compares the indications of whether each tire 14, 16, 18, and 20 is rolling or is stationary with the information of whether vehicle 10 is moving or is stationary to determine if an unmonitored tire is installed on the vehicle. Controller 32 is further operable to use the tire rolling/stationary information and the vehicle moving/stationary information to determine the installation of an unmonitored tire such as spare tire 22 or a foreign tire on vehicle 10 in place of one of normally installed tires 14, 16, 18, and 20 when the replaced normally installed tire is stored in the storage compartment.

The inferred tire rolling technique using pressure and/or temperature information is based on the ideal gas law: $PV=nRT$, where P is pressure, V is volume, n is the number of moles of air present, R is the universal gas constant, and T is temperature. As such, when the temperature of a tire goes up, then the pressure of the tire goes up. Likewise, when the temperature of the tire goes down, then the pressure of the tire goes down. The pressure of a tire increases as the tire heats up while the tire is installed on a vehicle and the vehicle is moving. The pressure of the tire stabilizes once it has warmed up while the vehicle is moving. Similarly, the pressure of a tire decreases when the tire is installed on a vehicle and the vehicle is stationary after having been driven. Using this known behavior, motion of a tire (i.e., whether the tire is rolling or is stationary) can be inferred from the pressure and/or temperature information of the tire.

As such, the processor of a wheel unit installed to a tire such as wheel unit 24 installed to tire 14 is able to determine whether tire 14 is rolling or is stationary by analyzing the pressure and/or temperature signals for tire 14. In particular, processor 42 of wheel unit 24 determines whether the pressure and/or temperature of tire 14 exceeds a delta threshold in a period of time. If the pressure and/or temperature of tire 14 exceeds the delta threshold, then processor 42 determines that tire 14 is rolling. Likewise, if the pressure and/or temperature of tire 14 does not exceed the delta threshold, then processor 42 determines that tire 14 is stationary. In turn, processor 42 generates a bit-type information indicating whether tire 14 is rolling or is stationary to transmitter 44 for the transmitter to transmit to controller 32 with the wheel unit signal for tire 14.

Controller 32 analyzes the wheel unit signal to determine whether wheel unit 24 determined that tire 14 is rolling or is stationary. Controller 32 also has knowledge of whether vehicle 10 is moving or is stationary based on the speed signal from speed sensor 52. If the pressure and/or temperature of tire 14 exceeds the delta threshold after vehicle ignition within an allotted time-frame while vehicle 10 is moving, then controller 32 confirms that tire 14 is rolling and further determines that tire 14 is installed on vehicle 10. Likewise, if the pressure and/or temperature of tire 14 does not exceed the delta threshold after vehicle ignition within an allotted time-frame while vehicle 10 is moving, then controller 32 confirms that tire 14 is stationary and further determines that tire 14 is not installed on vehicle 10. Based on the determination that tire 14 is not installed on vehicle 10, controller 32 determines that an unmonitored tire such as spare tire 22 or a foreign tire is installed on vehicle 10 in place of tire 14 to enable the vehicle to be moving.

As such, meeting the requirement of detecting the installation of an unmonitored tire on a vehicle when a monitored tire (i.e., one of the normally installed tires) is stored in the vehicle compartment in accordance with the first operation entails comparing pressure and/or temperature measurements of the normally installed tire against a delta threshold after vehicle ignition during a drive cycle within an allotted time-frame. The normally installed tire does not experience a pressure and/or temperature difference caused by the vehicle moving as a result of being stored and thus does not transmit motion status indicative of the tire rolling. All wheel unit signal transmissions from the normally installed tires, whether installed on vehicle 10 or stored in the vehicle compartment, can periodically continue with the distinguishing feature of the motion status bit being set. The motion status need only be set before the timer elapses. Once a constant vehicle driving condition is reached, the pressure and/or temperature of the normally installed tires which are installed on vehicle 10 stabilizes and the wheel units of these normally installed tires continue to transmit the wheel unit signals containing the pressure/temperature signals, but the motion bit would not need to be set for the remaining drive cycle. Controller 32 actuates warning light 52 to remain on for the normally installed tire which did not transmit rolling mode status (i.e., an unmonitored tire) for the duration of the drive cycle.

The operation of TPMS 12 in accordance with the first operation as shown in flowchart 60 begins with controller 32 determining whether the ignition of vehicle 10 is on as shown in block 62. Controller 32 receives a signal indicative of whether vehicle 10 is on from an ignition sensor in the vehicle. If the vehicle ignition is on, then controller 32 monitors the speed signal from speed sensor 50 to determine whether vehicle 10 is moving and has been moving at a normal speed (e.g., greater than 30 mph) for a predetermined amount of time as shown in block 64. While vehicle 10 is moving, the processors of wheel units 24, 26, 28, and 30 for normally installed tires 14, 16, 18, and 20 determine if the associated tire is rolling or is stationary by determining whether the pressure and/or temperature of the associated tire exceeds the delta threshold as shown in block 66. In turn, each wheel unit 24, 26, 28, and 30 transmits rolling status information indicative of whether the associated tire is rolling or is stationary to controller 32 as shown in block 68. Controller 32 analyzes the rolling status information to determine if any normally installed tire 14, 16, 18, and 20 is stationary as shown in block 70. If a normally installed tire is stationary, then controller 32 determines that an unmonitored tire is installed on vehicle 10 in place of the normally installed tire as shown in block 72. The unmonitored tire may be spare tire 22 or another normally installed tire (i.e., a foreign tire) having an unlearned wheel unit. Controller 32 determines that an unmonitored tire is installed on vehicle 10 in place of the normally installed tire as a result of knowing that vehicle 10 is moving and that the normally installed tire is stationary. Consequently, controller 32 determines that the stationary normally installed tire is not installed on vehicle 10 and that an unmonitored tire must be installed on the vehicle in its place. Motion of a normally installed tire can be inferred again during the drive cycle depending on each occurrence of pressure and/or temperature changes from previous static measurements exceeding the delta threshold.

A wheel unit for a normally installed tire may determine that the tire is rolling in accordance with the following process: after pressure of the tire is constant for some period of time (e.g., ten minutes), if the tire pressure increases by some amount over some period of time (e.g., $\Delta P > +10$ kPa over five minutes) and if the tire temperature increases by some amount over the same period of time that the tire pressure increases (e.g., $\Delta T > +2.5°$ C. over the same five minutes), then the tire is rolling.

Likewise, a wheel unit for a normally installed tire may determine that the tire is stationary in accordance with the following process: after the pressure of the tire is constant for some period of time (e.g., ten minutes), if the tire pressure decreases by some amount over some period of time (e.g., $\Delta P > -10$ kPa over five minutes) and if the tire temperature decreases by some amount over the same period of time that the tire pressure decreases (e.g., ΔT>−2.5° C. over the same five minutes), then the tire is stationary. (It is noted that there is no real stationary mode for a periodically transmitting wheel unit. Rather, it is merely in a static mode. However, the word stationary is used herein is to be used in place of the word static.)

Referring now to FIG. 4, with continual reference to FIGS. 1 and 2, a flowchart 80 describing operation of TPMS 12 in accordance with a second operation for detecting the installation of an unmonitored tire on vehicle 10 is shown. In general, the second operation represents an inferred tire rolling technique using received signal strength of the tire signals. In this technique, controller 32 determines whether each of tires 14, 16, 18, and 20 is rolling or is stationary based on the received signal strength indicator (RSSI) generated by receiver 46 in response to receiving the wheel unit signals from wheel units 24, 26, 28, and 30. Controller 32 compares the knowledge of whether each of tires 14, 16, 18, and 20 is rolling or is stationary with the information of whether vehicle 10 is moving or is stationary to determine if a particular one of tires 14, 16, 18, and 20 is not installed on vehicle 10. In the event that controller 32 determines that a particular one of tires 14, 16, 18, and 20 is not installed on vehicle 10 while vehicle 10 is moving, then controller 32 infers that an unmonitored tire is installed on the vehicle in place of the particular one of tires 14, 16, 18, and 20.

The inferred rolling technique using received signal strength is based on the fact that the signal strength of a wheel unit signal received by receiver 46 of controller 32 from a wheel unit varies as the tire associated with wheel unit rotates (i.e., rolls). For instance, if tire 14 is installed on vehicle 10 and vehicle 10 is moving such that tire 14 is rolling, then the strength of the wheel unit signal transmitted from wheel unit 24 as received by receiver 46 varies. This occurs as a result of the position of wheel unit 24 changing with respect to the position of receiver 46 over each revolution of tire 14. Likewise, if tire 14 is not installed on vehicle 10 such that tire 14 is stationary, then the strength of the wheel unit signal transmitted from wheel unit 24 as received by receiver 46 remains constant. This occurs as a result of the position of wheel unit 24 staying the same with respect to the position of receiver 46 as tire 14 remains in place.

Receiver 46 generates a received signal strength indicator (RSSI) signal for each wheel unit signal received from wheel units 24, 26, 28, and 30. Receiver 46 provides the RSSI signal to processor 48 of controller 32 for processor 48 to determine if each of tires 14, 16, 18, and 20 associated with the RSSI signals is rolling or is stationary. As noted, processor 48 also has knowledge of whether vehicle 10 is moving or is stationary based on the speed signal from speed sensor 52. If vehicle 10 is moving and if the RSSI signal for a tire continually varies in accordance with tire rotation, then controller 32 confirms that the tire is rolling and further determines that the tire is installed on vehicle 10. Likewise, if vehicle 10 is moving and if the RSSI signal for a tire remains constant in accordance with the tire staying in place, then controller 32 confirms that the tire is stationary and further determines that the tire is not installed on vehicle 10. Based on the determination that the tire is not installed on vehicle 10, controller 32 determines that an unmonitored tire is installed on vehicle 10 in place of the tire to enable the vehicle to be moving. In turn, controller 32 actuates warning light 52 to indicate which the location of unmonitored tire on vehicle 10.

As such, meeting the requirement of detecting the installation of an unmonitored tire on a vehicle when a monitored normally installed tire is stored in the vehicle compartment in accordance with the second operation entails monitoring the RSSI signals for the wheel unit signals transmitted by the wheel units. Normally installed tires installed on moving vehicle 10 are associated with a varying RSSI signal while a normally installed tire not installed on moving vehicle 10 is associated with a constant RSSI signal. As such, the wheel unit signal transmissions from the normally installed tires, whether installed on vehicle 10 or stored in the vehicle compartment, can periodically continue with the distinguishing feature being whether the associated RSSI signal varies or remains constant.

The operation of TPMS 12 in accordance with the second operation as shown in flowchart 80 begins with controller 32 determining whether the ignition of vehicle 10 is on as shown in block 82. Controller 32 receives a signal indicative of whether vehicle 10 is on from an ignition sensor in the vehicle. If the vehicle ignition is on, then controller 32 monitors the speed signal from speed sensor 50 to determine whether vehicle 10 is moving and has been moving at a normal speed (e.g., greater than 45 mph) for a predetermined amount of time as shown in block 84. After vehicle 10 has been moving, receiver 46 of controller 32 receives the wheel unit signals from wheel units 24, 26, 28, and 30 for tires 14, 16, 18, and 20 and generates a RSSI signal for each of the wheel unit signals. The RSSI signal for a wheel unit signal is indicative of the strength of the wheel unit signal as received by receiver 46 over a period of time. Receiver 46 provides the RSSI signals to processor 48 of controller 32 along with the wheel unit signals. Processor 48 determines from the RSSI signals which normally installed tires are rolling and which normally installed tire(s) is stationary as a function of whether the associated RSSI signals vary or remain constant as shown in block 86. If controller 32 determines that a normally installed tire is stationary as shown in block 88, then controller 32 determines that an unmonitored tire is installed on vehicle 10 in place of the normally installed tire as shown in block 90. Controller 32 determines that an unmonitored tire is installed on vehicle 10 in place of a stationary normally installed tire as a result of knowing that vehicle 10 is moving. Consequently, controller 32 determines that the stationary normally installed tire is not installed on vehicle 10 and that an unmonitored tire must be installed on vehicle 10 in its place.

In particular, controller 32 may determine whether all of normally installed tires 14, 16, 18, and 20 are installed on vehicle 10 or whether an unmonitored tire is installed on vehicle 10 in place of one of the normally installed tires using the following algorithm. First, controller 32 waits until vehicle 10 is moving and has reached a normal cruising speed such as 45 mph for a period of time. While the speed of vehicle 10 remains fairly constant after reaching the cruising speed, controller 32 monitors the RSSI voltage signals for a period of time (e.g., ten minutes). If all four wheel units 24, 26, 28, and 30 transmit at least two consecutive wheel unit signals having an associated RSSI signal difference greater than a delta threshold (e.g, ΔRSSI>3 db), then controller 32 determines that all normally installed tires 14, 16, 18, and 20 are installed on vehicle 10. However, if one or more of wheel units 24, 26, 28, and 30 transmit two consecutive wheel unit signals having an associated RSSI signal difference less than the delta threshold (e.g., ΔRSSI<3 db), then controller 32 determines that each normally installed tire having an associated RSSI signal difference less than the delta threshold is not installed on vehicle 10. Consequently, controller 32 determines that an unmonitored tire is installed on vehicle 10. If the motion of vehicle 10 becomes anything other than the normal speed before the routine completes, then the comparison of the RSSI signal differences repeats again.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A tire pressure monitoring system comprising:
    a plurality of wheel units respectively associated with tires normally installed on a vehicle, each wheel unit including a sensor for generating a sensor signal indicative of a parameter of the tire which varies compared to a threshold when the tire is installed on the vehicle and is rolling while the vehicle is moving and which remains constant compared to the threshold when the tire is stationary irrespective of whether the vehicle is moving, a processor for processing the sensor signal to determine whether the tire is rolling or is stationary, and a transmitter for transmitting a tire signal including an indication of whether the tire is rolling or is stationary; and
    a controller to be installed in the vehicle, the controller including a receiver for receiving the tire signals from the wheel units, the controller further receiving a speed signal indicative of whether the vehicle is moving or is stationary, wherein the controller processes the tire signals and the speed signal to determine if any of the tires is stationary while the vehicle is moving, wherein the controller generates a warning signal indicative of an unmonitored tire installed on the vehicle in place of one of the tires upon determining that the one of the tires is stationary while the vehicle is moving.

2. The system of claim 1 wherein:
    the sensor includes a pressure sensor for generating a pressure sensor signal indicative of the pressure of the tire, wherein the pressure of the tire varies compared to a threshold when the tire is installed on the vehicle and is rolling while the vehicle is moving and remains constant compared to the threshold when the tire is stationary irrespective of whether the vehicle is moving.

3. The system of claim 2 wherein:
    the tire signal transmitted by the transmitter includes the pressure sensor signal;
    wherein the controller processes the pressure sensor signal to determine the pressure of the tire, wherein the controller generates a warning signal if the pressure of the tire is abnormal.

4. The system of claim 1 wherein:
    the sensor includes a temperature sensor for generating a temperature sensor signal indicative of the temperature of the tire, wherein the temperature of the tire varies compared to a threshold when the tire is installed on the vehicle and is rolling while the vehicle is moving and remains constant compared to the threshold when the tire is stationary irrespective of whether the vehicle is moving.

5. The system of claim 4 wherein:
    the tire signal transmitted by the transmitter includes the temperature sensor signal;
    wherein the controller processes the temperature sensor signal to determine the temperature of the tire, wherein the controller generates a warning signal if the temperature of the tire is abnormal.

6. The system of claim 1 wherein:
    the sensor includes a pressure sensor for generating a pressure sensor signal indicative of the pressure of the tire and a temperature sensor for generating a temperature sensor signal indicative of the temperature of the tire, wherein both the pressure and the temperature of the tire vary compared to respective thresholds when the tire is installed on the vehicle and is rolling while the vehicle is moving and remain constant compared to respective thresholds when the tire is stationary irrespective of whether the vehicle is moving.

7. The system of claim 1 wherein:
    the signal strength of each tire signal as received by the receiver varies over a period of time when the associated tire is rolling and remains constant over the period of time when the associated tire is stationary, wherein for each tire signal the receiver generates a received signal strength indicator (RSSI) signal indicative of the signal strength of the tire signal as received by the receiver and provides the RSSI signals to the controller, wherein the controller processes the RSSI signals along with the tire signals and the speed signal to determine if any of the tires is stationary while the vehicle is moving.

8. The system of claim 1 wherein:
    each wheel unit further includes an identifier memory for storing a unique identifier, wherein the transmitter transmits the unique identifier with the tire signal;
    wherein the controller processes the tire signals to obtain the unique identifiers in order to associate the tire signals with the tires.

9. A tire pressure monitoring system comprising:
    a plurality of wheel units respectively associated with tires normally installed on a vehicle, each wheel unit including a sensor for generating a sensor signal indicative of a parameter of the associated tire and a transmitter for transmitting the sensor signal; and
    a controller to be installed in the vehicle, the controller including a receiver for receiving the sensor signals from the wheel units, the signal strength of each sensor signal as received by the receiver varies over a period of time when the associated tire is rolling and remains constant over the period of time when the associated tire is stationary, wherein for each sensor signal the receiver generates a received signal strength indicator (RSSI) signal indicative of the signal strength of the sensor signal as received by the receiver and provides the RSSI signals to the controller, the controller further receiving a speed signal indicative of whether the vehicle is moving or is stationary, wherein the controller processes the RSSI signals and the speed signal to determine if any of the tires is stationary while the vehicle is moving, wherein the controller generates a warning signal indicative of an unmonitored tire installed on the vehicle in place of one of the tires upon determining that the one of the tires tire is stationary while the vehicle is moving.

10. The system of claim 9 wherein:
    the sensor is a pressure sensor and the sensor signal is indicative of the pressure of the tire;
    wherein the controller processes the pressure signal to determine the pressure of the tire, wherein the controller generates a warning signal if the pressure of the tire is abnormal.

11. The system of claim 9 wherein:
the sensor is a temperature sensor and the sensor signal is indicative of the temperature of the tire;
wherein the controller processes the sensor signal to determine the temperature of the tire, wherein the controller generates a warning signal if the temperature of the tire is abnormal.

12. The system of claim 9 wherein:
each wheel unit further includes an identifier memory for storing a unique identifier, wherein the transmitter transmits the unique identifier with the sensor signal;
wherein the controller processes the sensor signals to obtain the unique identifiers in order to associate the sensor signals with the tires.

13. The system of claim 9 wherein:
while processing each RSSI signal and the speed signal to determine if a tire is stationary while the vehicle is moving, the controller determines that the tire is stationary if the RSSI signal remains constant over a period of time.

14. The system of claim 9 wherein:
while processing each RSSI signal and the speed signal to determine if a tire is stationary while the vehicle is moving, the controller determines that the tire is rolling if the RSSI signal varies over a period of time.

15. A tire pressure monitoring method comprising:
monitoring a parameter of a tire normally installed on a vehicle;
generating a sensor signal indicative of the parameter of the tire;
transmitting the sensor signal from the tire to a controller installed on the vehicle, wherein the signal strength of the sensor signal as received by the controller varies over a period of time when the tire is rolling and remains constant over the period of time when the tire is stationary;
generating at the controller a received signal strength indicator (RSSI) signal indicative of the signal strength of the sensor signal as received by the controller;
providing a speed signal indicative of whether the vehicle is moving or is stationary to the controller;
processing at the controller the RSSI signal and the speed signal to determine if the tire is stationary while the vehicle is moving; and
generating at the controller a warning signal indicative of an unmonitored tire installed on the vehicle in place of the tire upon determining that the tire is stationary while the vehicle is moving.

16. The method of claim 15 wherein the sensor signal is indicative of the pressure of the tire, the method further comprising:
processes at the controller the sensor signal to determine the pressure of the tire; and
generating at the controller a warning signal if the pressure of the tire is abnormal.

17. The method of claim 15 wherein the sensor signal is indicative of the temperature of the tire, the method further comprising:
processing at the controller the sensor signal to determine the temperature of the tire; and
generating at the controller a warning signal if the temperature of the tire is abnormal.

18. The method of claim 15 further comprising:
transmitting a unique identifier with the sensor signal from the tire to the controller; and
processing at the controller the sensor signal to obtain the unique identifiers in order to associate the sensor signal with the tire.

19. The method of claim 15 wherein:
processing at the controller the RSSI signal and the speed signal to determine if the tire is stationary while the vehicle is moving includes determining that the tire is stationary if the RSSI signal remains constant over a period of time.

20. The method of claim 15 wherein:
processing at the controller the RSSI signal and the speed signal to determine if the tire is stationary while the vehicle is moving includes determining that the tire is rolling if the RSSI signal varies over a period of time.

* * * * *